(No Model.)
N. J. PLANTHABER.
EAVES TROUGH PROTECTOR.
No. 490,414.　　　　　　　Patented Jan. 24, 1893.
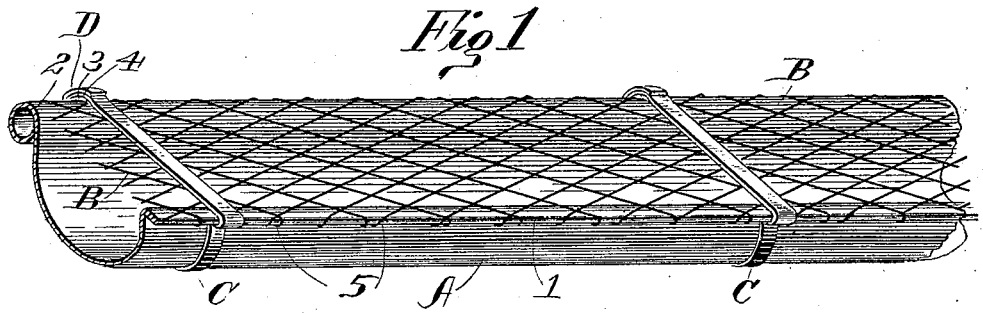
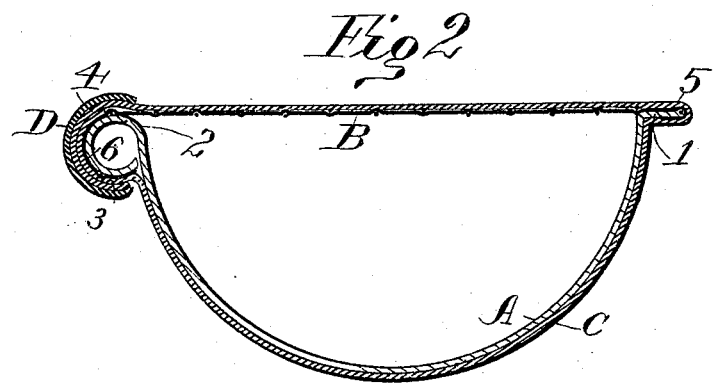
Witnesses　　　　　　　　Inventor
　　　　　　　　　　　　Newton J. Planthaber
　　　　　　　　　　　per John G. Manahan
　　　　　　　　　　　　　Attorney

UNITED STATES PATENT OFFICE.

NEWTON J. PLANTHABER, OF STERLING, ASSIGNOR OF ONE-HALF TO ALEXANDER J. McNEIL, OF ROCK FALLS, ILLINOIS.

EAVES-TROUGH PROTECTOR.

SPECIFICATION forming part of Letters Patent No. 490,414, dated January 24, 1893.

Application filed October 27, 1891. Renewed November 21, 1892. Serial No. 452,633. (No model.)

*To all whom it may concern:*

Be it known that I, NEWTON J. PLANTHABER, a citizen of the United States, residing at Sterling, in the county of Whiteside and State of Illinois, have invented certain new and useful Improvements in Eaves-Trough Protectors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to, improvements in eaves trough protectors, and consists of an extension, over the upper portion of the eaves trough, of a metallic sieve having meshes of such character that the water may readily pass through into the trough, while leaves and other débris would be excluded therefrom, by the sieve, such sieve being bent downward at one side over the usual trough bead, and at the other side over a flange formed on the exterior of the inner edge of said trough.

My invention is intended to prevent leaves from entering within the eaves trough—the sieve cap detaining the leaves on its upper surface, and when the leaves have become dry the wind will carry them off from the building. I attain this purpose by the mechanism illustrated in the accompanying drawings in which—

Figure 1. is a perspective of an eaves trough provided with my invention. Fig. 2. is a vertical cross section thereof.

A. is the usual trough, formed in the usual mode except that I think it is advantageous to form an exterior flange 1. along the inner edge of the trough A.

B. is a wire sieve, originally slightly wider than the trough A. formed in sections of such length as may be convenient and practicable, and covering the entire top of said trough. The inner edge of the sieve B. has a downward bend 5. engaging the inner edge of the trough A. and the outer side of said sieve has a downward bend 6. which clasps the usual bead 2. formed along the outer edge of the trough A. The construction with the flange 1. will operate reasonably well to retain the sieve B. by reason of the tendency of said sieve to retain its lateral bends, and from the fact that the clasp of said lateral downward bend on each edge of the sieve B. is continuous the full length of the sieve, but in order to more effectually secure the sieve B. from all possibility of casual displacement, I provide a metallic band C. usually formed of tin, and of the width of about half an inch, which is passed around the trough A. and over the sieve B. with its one end bent into a hook 3. which is hooked upwardly over the bead 2. of the trough A. and its other end provided with a hook 4. which is hooked downwardly over the hook 3. and around said bead, as shown in Fig. 2. The hook 4. assists in holding hook 3. in place, but to more effectually secure both of said hooks in position, I use a sheet metal clamp D. constructed of thicker and stronger metal than the tin, and bent to conform to the exterior of the hook 4. and said clamp D. being somewhat elastic, is sprung over the outside of hook 4. of the band C. and by its contractile quality, retains its position, and secures the permanency of the band C. The bands C. can be placed at any desired intervals along the trough A. and by reason of their being narrow, do not to any serious degree, interfere with the passage of the water through the sieve B. into the trough A.

The sieve B. can be placed, as shown, on the trough A. in the shop, or before the trough A. is attached to the building, or said sieve can be attached to a trough already in place.

What I claim as my invention and desire to secure by Letters Patent of the United States is,

1. The combination of the trough A. provided with flange 1. and bead 2. and the sieve B. provided with the bends 5. and 6. adapted to clasp respectively the inner edge, and the bead 2. of said trough, substantially as shown and for the purpose described.

2. The combination of the trough A, provided on its respective sides with flange 1 and bead 2; the sieve B provided with bends 5 and 6, adapted respectively to clasp said flange and bead; the band C provided with hooks 3 and 4 to supplementarily embrace said sieve at the bead 2 and the clamp D adapted to embrace the bead 2 outside of said band C; substantially as shown and for the purpose described.

In testimony whereof I affix my signature in presence of two witnesses.

NEWTON J. PLANTHABER.

Witnesses:
GEO. M. ROBINSON,
ALEXANDER J. MCNEIL.